(12) United States Patent
Arroyo et al.

(10) Patent No.: US 7,270,686 B2
(45) Date of Patent: Sep. 18, 2007

(54) METHOD FOR MAKING A FUEL CELL WITH LARGE ACTIVE SURFACE AND REDUCED VOLUME

(75) Inventors: Jean Arroyo, Meylan (FR); Didier Bloch, Biviers (FR); Jean-Yves Laurent, Claix (FR); Didier Marsacq, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 234 days.

(21) Appl. No.: 10/495,251

(22) PCT Filed: Nov. 15, 2002

(86) PCT No.: PCT/FR02/03924

§ 371 (c)(1),
(2), (4) Date: May 10, 2004

(87) PCT Pub. No.: WO03/043117

PCT Pub. Date: May 22, 2003

(65) Prior Publication Data

US 2005/0019635 A1     Jan. 27, 2005

(30) Foreign Application Priority Data

Nov. 16, 2001 (FR) .................................. 01 14841

(51) Int. Cl.
*H01M 8/10* (2006.01)
*H01M 8/24* (2006.01)
*H01M 4/64* (2006.01)

(52) U.S. Cl. .................. 29/623.1; 429/32; 429/38; 429/233; 429/241; 429/243; 429/245

(58) Field of Classification Search ............... 29/623.1; 429/32, 38, 233, 241, 243, 245
See application file for complete search history.

(56) References Cited

U.S. PATENT DOCUMENTS

| | | | |
|---|---|---|---|
| 5,279,906 A | 1/1994 | Yoshimura et al. |
| 5,759,712 A | 6/1998 | Hockaday |
| 6,001,500 A | 12/1999 | Bass et al. |
| 6,007,932 A | 12/1999 | Steyn |

(Continued)

FOREIGN PATENT DOCUMENTS

FR    2 347 783    11/1977

(Continued)

*Primary Examiner*—Stephen Kalafut
*Assistant Examiner*—Angela J. Martin
(74) *Attorney, Agent, or Firm*—Pearne & Gordon LLP

(57) ABSTRACT

The present invention relates to a process for producing a fuel cell, comprising a step of forming a plurality of holes (10) in at least two substrates (9); each hole is in the seat of an individual fuel cell, the said holes having a particular geometry, such as a shape of a truncated cone or a truncated pyramid shape.

The various individual cells are then electrically connected by networks of electrical connections (11, 12) and are supplied via a reactant distribution network, the assembly formed by a substrate (9), the cells and the networks constituting a base module (9'). Finally, at least two base modules (9') are assembled, the individual cells of each base module being positioned facing the individual cells of the adjacent base module(s).

20 Claims, 3 Drawing Sheets

U.S. PATENT DOCUMENTS

| | | |
|---|---|---|
| 6,080,501 A | 6/2000 | Kelley et al. |
| 6,528,199 B1 * | 3/2003 | Mercuri et al. ............... 429/40 |
| 6,605,379 B1 * | 8/2003 | Mercuri et al. ............... 429/38 |
| 6,645,658 B2 * | 11/2003 | Morozumi ................... 429/34 |
| 7,008,718 B2 * | 3/2006 | Kubota et al. ................ 429/39 |

FOREIGN PATENT DOCUMENTS

| | | | |
|---|---|---|---|
| FR | 2 814 857 | | 4/2002 |
| JP | 63-138667 | | 6/1988 |
| JP | 63138667 | * | 6/1988 |
| WO | WO97/11503 | | 3/1997 |
| WO | WO 00/45457 | | 8/2000 |
| WO | WO 00/69007 | | 11/2000 |
| WO | WO 01/54217 A2 | | 4/2001 |
| WO | WO 02/080298 A2 | | 10/2002 |

* cited by examiner

METHOD FOR MAKING A FUEL CELL WITH LARGE ACTIVE SURFACE AND REDUCED VOLUME

TECHNICAL FIELD

The present invention relates to a process for producing a fuel cell with a large active surface area and a small volume.

The invention therefore deals with the field of fuel cells, and more particularly fuel cells with a solid polymer membrane as electrolyte, such as PEMFCs ("Proton Exchange Membrane Fuel Cells") and DMFCs ("Direct Methanol Fuel Cells").

Fuel cells of the solid polymer electrolyte type are employed, in particular, in land, air and water transport and in particular in land vehicles, which are currently the subject of numerous development programmes aimed at finding alternatives to the use of batteries in electrical vehicles.

PRIOR ART

In general, fuel cells are composed of a stack of individual cells. Each of these cells comprises an anode and a cathode positioned on either side of an electrolyte. The fuel, such as hydrogen $H_2$ for hydrogen fuel cells, is oxidized at the anode, thereby producing protons and electrons. The electrons rejoin the external electric circuit, whereas the protons are directed towards the cathode, through the electrolyte, which is generally in the form of an ion-conducting membrane. Oxidation by the oxidizing agent, such as atmospheric oxygen, takes place at the cathode, accompanied, in the case of hydrogen fuel cells, by the production of water resulting from the recombination of the ions produced by the reduction and of the protons.

The power densities obtained at one individual cell are very low and are generally insufficient to allow electrical equipment to function. It is therefore indispensable to assemble a large number of these individual cells in order to obtain a significant power. Assembly is generally effected by means of a stack of individual cells, the cells being separated by means of leaktight plates, known as bipolar plates.

Numerous configurations have already been proposed in the prior art in the field of fuel cells.

Thus, medium-power fuel cells, i.e. fuel cells with a power of 10 to 50 kW per cell, are generally put together by the "filter-press" combining of bipolar plates made from graphite or stainless steel and membrane electrode assemblies obtained by pressing two fabric electrodes and a proton-conducting membrane made from NAFION®.

Low-power fuel cells, i.e. with a power of 0.5 to 50 W per cell, known as micro fuel cells, require the development of architectures and processes which are often derived from technologies used in microelectronics. The difficulty resides in assembling the micro-electrode with the thin film of proton-conducting material. Moreover, the micro-electrode must have a high electron conductivity, a high permeability to gas, in particular to hydrogen, in the case of a PEMFC architecture for hydrogen/air fuel cells, a high permeability to gas and to methanol in the case of a DMFC architecture for methanol/air fuel cells, an ability to take the form of a thin film on a small surface area, and a good thermo-mechanical resistance. The micro-electrode must also have a surface which is suitable for the deposition of a catalyst in dispersed form.

In the literature, a distinction is drawn between architectures based on porous silicon on which a catalyst then a Nafion® membrane are successively deposited in order to form the membrane electrode assembly. However, the performance of a device of this type is limited by the poor cohesion of the various layers, thereby creating a strong interfacial resistance, and by a very weak dispersion of the catalyst, the latter being finely divided, in order to obtain a strongly electron-conducting deposit.

Various laboratories have developed technologies on non-porous silicon. Thus, a team from the Lawrence Livermore National Laboratory has developed a micro fuel cell by depositing, firstly, a metallic thin film of nickel acting as an electron collector on a silicon substrate. The catalyst then the proton conductor are then deposited on the nickel. The nickel is then perforated by chemical etching in order to bring into contact the catalyst and the reducing agent, namely the hydrogen or the methanol depending on the intended fuel cell system. This technique has a certain number of drawbacks linked in particular to the properties of nickel. Specifically, nickel is sensitive to corrosion phenomena caused by the strongly acidic nature of the proton conductor. Moreover, the catalyst is poorly dispersed at the perforated nickel layer, which has a low capacity to draw a homogeneous dispersion of the reducing agent over the catalyst. Finally, this technology entails a low probability of triple points being present.

Patent application WO 97/11503 [1] and American patent U.S. Pat. No. 5,759,712 [2] describe a fuel cell architecture based on the use of a microporous substrate impregnated with a proton-conducting material as the central element of a micro fuel cell system. The various materials required to form a fuel cell are therefore deposited on either side of this substrate using conventional vacuum deposition techniques. This invention has two main drawbacks: firstly the fragility of the polymer substrate, in particular when it is treated using aggressive vacuum deposition techniques, and secondly the poor electrochemical performance, linked in particular to the lack of active surface area and also to the fragility of the catalyst deposit formed directly on the proton exchange membranes.

All of the architectures presented have the particular feature of being entirely planar, which means that it is therefore not possible to obtain a sufficiently large electrode surface area to supply portable electronic devices with energy.

To this end, the prior art has proposed various nonplanar geometries.

U.S. Pat. Nos. 6,080,501 [3], 6,007,932 [4] and 6,001,500 [5] describe a cylindrical architecture of a miniature fuel cell. This architecture is based on winding a membrane electrode assembly of planar geometry as is conventionally employed around a mandrel made from metal foam. However, the performance of an assembly of this type is limited, for two main reasons:

- the membrane electrode assembly, which was initially planar, is not suitable for a cylindrical geometry, which means that it is virtually impossible to re-establish the anode-anode, cathode-cathode and membrane-membrane contacts after the planar membrane electrode assembly has been wound;
- the current collectors are not in intimate contact with the anode and the cathode, resulting in excessive interfacial resistances.

Another American team has developed a similar tubular miniature fuel cell design. A membrane electrode assembly is wound into a cylinder. This cylinder is then integrated in a metallic "cylinder-carrier" device making it possible to ensure collection of the electric current. However, this type of architecture is not suitable for portable electronic equipment, in particular on account of the bulk generated by the use of the "cylinder-carrier" system.

Patent JP 63 138667 [6] presents a process for realizing a nonplanar fuel cell structure, the said process consisting in depositing a cell film on the internal surface of a proportion of the holes in a substrate in grid form. The possibility of assembling a plurality of these substrates is also described.

However, this device, obtained by the process described, has the following drawbacks:

on account of the configuration of the holes, and more specifically on account of the fact that the holes are in the shape of a parallelepiped of very low height, it is difficult to deposit a regular cell film over the internal surface of the said holes;

on account of the geometry and the arrangement of the holes in this document, it is necessary to dedicate a proportion of the holes in the substrate in the form of a grid to transporting the fuel cell feed reactants, which entails a loss of surface area for depositing the cell films and consequently a power loss in the said cell caused by this configuration.

There is therefore a real need for a process for producing fuel cells which makes it possible to obtain fuel cells with the smallest possible total volume while preserving a large electrode active surface area and also while allowing a network of electrical connections and a reactant distribution network to be produced.

Moreover, there is a need for it to be possible, with this type of fuel cells, to develop electrical powers which are compatible with the said fuel cells being used in the field, in particular, of land transport.

SUMMARY OF THE INVENTION

The object of the present invention is therefore to propose a process for producing a fuel cell, suitable for everyday equipment, which, inter alia, meets the need referred to above and which does not have the drawbacks, disadvantages, defects and limitations of the prior art, and which in particular makes it possible to produce a fuel cell with a much larger active surface area than its floor occupying area. Moreover, the object of the present invention is to propose a process for producing a fuel cell which makes it possible to obtain a high-power fuel cell while saving a significant space for forming a reactant connection and electrical connection network in the said fuel cell.

Finally, the object of the present invention is to provide a fuel cell of reduced volume which still has a large active surface area.

This and further objects are achieved, according to the invention, by a process for producing a fuel cell, the said fuel cell comprising a set of individual cells which are electrically connected to one another, each individual cell comprising at least three layers, namely a membrane layer positioned between a first electrode layer and a second electrode layer, the said process comprising, in succession,. the following steps:

a step of forming a plurality of holes in at least two substrates, each hole opening out on either side on two opposite faces of each substrate, via a first orifice section and a second orifice section, and each hole having a lateral surface;

a step of forming individual cells on the lateral surface of each of the said holes;

a step of forming, on at least one of the said opposite faces of each substrate, a network of electrical connections and a reactant distribution network, the said networks connecting the individual cells to one another, the assembly formed by a substrate, the individual cells and the said networks constituting a base module;

a step of assembling at least two base modules in such a way that the individual cells of each base module are positioned facing the individual cells of the adjacent base module(s), the said process being characterized in that, during the step of forming the plurality of holes, each hole is formed in such a manner that at least one out of the said first and/or second orifice section has a surface area which is smaller than the surface area of at least one cross section through the said hole taken in a plane which is parallel to the said opposite faces, and in that, for each hole, the first or second orifice section has a surface area which is smaller than the surface area of the other orifice section.

It should be noted that according to the invention the term "base module" refers to the assembly composed of a substrate within which are formed individual fuel cells, the said cells being electrically connected to one another via networks of electrical connections and being supplied via reactant distribution networks, the said networks being formed at at least one of the faces of the substrate on which the holes are formed.

It should be noted that according to the invention the lateral surface denotes the surface of the walls which delimit the hole.

It should be noted that according to the invention the reactant distribution network denotes the network which will allow the electrodes to be supplied with oxidizing agent or reducing agent.

It should be noted that wherever reference is made to a section through the hole taken in a plane parallel to the opposite faces of the substrate, what is meant is any section apart from the abovementioned orifice sections.

It should be noted that the term substrate is preferably to be understood as meaning a substrate which is substantially parallelepipedal in shape.

It should be noted that the term active surface area, in the above text and in the text which follows, is to be understood as meaning the surface area occupied by the electrodes, where the electrochemical reactions take place in the fuel cell.

Holes according to the present invention may advantageously be holes which are substantially in the shape of a truncated cone or are substantially in the shape of a truncated pyramid.

The formation of the holes with a geometry of this type has the effect of bringing about the following advantages:

compared to holes with walls which are perpendicular to the substrate, as in the case of the design of the abovementioned Japanese document, the fact of forming holes with a profile comprising walls which are substantially inclined with respect to the vertical contributes to facilitating the deposition of the layers required to form the individual cells;

compared to holes with walls which are perpendicular to the substrate, the fact of forming holes with an orifice section surface area which is smaller than the surface area of the other orifice section makes it possible to save space at the faces where the said holes are formed, in particular at the surface which has the smallest orifice section surface areas; this space saving can be devoted to forming the electrical connection network and the reactant distribution network and/or to the formation of additional holes in order thereby to augment the active surface area of the fuel cell;

compared to holes with walls which are perpendicular to the substrate, the lateral surface (or internal surface area of the hole) can be larger, thereby increasing the active surface area, in so far as the lateral surface serves as a base for the formation of the individual cells.

It should be noted that wherever the above text refers, for comparison purposes, to holes with walls which are perpendicular to the substrate, these holes with perpendicular walls have an identical cross section to the first orifice section or second orifice section referred to above.

Moreover, the advantageous nature of the present invention resides in the fact of assembling two or more base modules in order to further increase the active surface area of the resulting fuel cell.

Therefore, the benefit of the present invention is in this way to allow the lateral surface area of the holes to be multiplied, with them arranged facing one another, by assembling at least two base modules.

Thus, by virtue of this process according to the invention, it is possible to obtain fuel cells with a reduced floor occupying area yet a large active surface area, in so far as the active surfaces of the fuel cell are located within the material which forms the substrate.

Moreover, the fact that the invention realizes systems derived from assembling a plurality of modules and moreover from the specific geometry of certain holes, has the major advantage of facilitating production of the active layers on the walls of the said holes.

In fact, if one considers a fuel cell architecture with a single module, the slope of the walls, for example in the case of holes which are conical in volume, would be fixed by the geometry, in particular the thickness of the substrate, the orifice section surface areas of the holes. In a system of this type, it would be necessary to develop greatly sloping walls in order to gain active surface area. By contrast, the system derived from assembling a plurality of modules as envisaged by the process according to the invention may be composed of modules of reduced height (than if a single module were to be used), and consequently the internal walls of the holes may have a less steep profile. Consequently, this system makes it easier to realize the deposition of layers in order to form the individual cells.

According to the invention, the holes formed in each substrate can be formed by etching or alternatively by laser ablation.

The substrate may be composed, according to the invention, of a material selected from the group consisting of silicon, such as porous silicon, graphite, ceramics and polymers.

By way of example, the ceramics may be titanium oxide or alumina and the polymers may be Teflon®, Peek® or polysulfones.

It is preferable for each hole formed in each substrate to have a first orifice section and a second orifice section with surface areas which are smaller than the lateral surface of the said hole, which has the advantage of allowing a large area of the faces of the substrate to be dedicated to forming the networks of electrical connections and the reactant distribution networks.

Individual cells are formed within the holes formed in each substrate, according to the invention, by successive deposition, on the lateral surface of each of the said holes, of at least three layers, in order to form the first electrode layer, the membrane layer and the second electrode layer.

This production phase may also comprise the deposition of current collectors at each electrode layer.

According to the invention, the assembling of two base modules, when this assembling places two faces without networks (namely electrical connection network and reactant distribution network) facing one another, may comprise the following successive steps:

a step of applying a bonding layer to at least one of the said faces without the said network(s); and a step of joining the base modules at the said faces.

According to the invention, the assembling of at least two base modules, placing faces of which at least one is provided with a network of electrical connections and/or with a reactant distribution network facing one another, may comprise the following successive steps:

a step of masking the face(s) provided with the said network(s) by means of an impervious and insulating layer;

a step of planarizing the face(s) provided with the said network(s);

a step of applying a bonding layer to at least one of the faces which are to be assembled;

a step of joining the said faces to be assembled of the said base modules.

The bonding layer is preferably of identical composition to the membrane layer.

This has the advantage in particular of allowing the application, in a single step, of the membranes to the walls of the holes and the bonding layer at the surface.

According to a variant embodiment of the invention, the bonding layer may also be an adhesive that is different from the membrane layer and is selected from a group consisting of epoxides, polyimides, silicones, acrylic polymers.

According to another variant of the invention, the bonding layer is made from a material selected from silicon oxide and silicon nitride.

Once the bonding layer has been applied, the joining of two base modules may be performed, according to the invention, by clamping.

According to another embodiment of the invention, the joining of two base modules may be performed by adhesive bonding.

Finally, the joining may be effected by molecular adhesion.

It is preferable for the masking step, the planarization step, the adhesive bonding step and the step of applying the bonding layer to be effected simultaneously by application of a single layer.

According to one particularly advantageous embodiment of the invention, the single layer is a layer of identical composition to the membrane layer.

According to a variant, the single layer is a bonding layer made from a material selected from silicon oxide and silicon nitride.

Another object of the present invention is to propose a fuel cell obtainable by the process described above.

BRIEF DESCRIPTION OF THE DRAWINGS

The invention will now be described in more detail with reference to the appended drawings, in which.

DETAILED DESCRIPTION OF THE INVENTION

Figure 1:
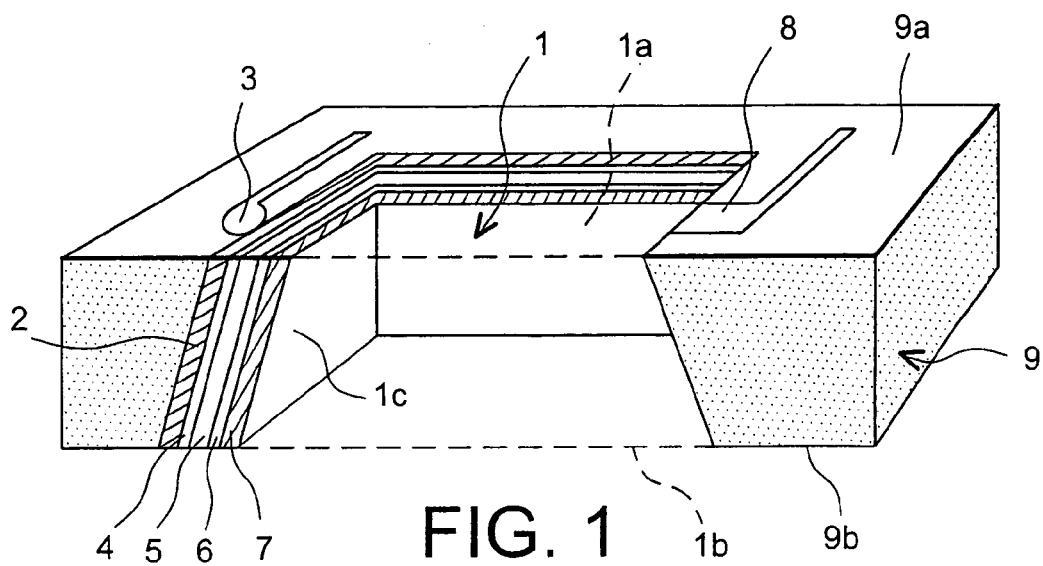
FIG. 1 shows a sectional view through a hole with a geometry corresponding to the present invention, on the lateral surface of which an individual fuel cell has been produced using the process of the invention.

The process for producing a fuel cell in accordance with the invention comprises, in succession, a step of forming a plurality of holes in at least two substrates, followed by a step of forming individual cells within each of the holes, a step of forming, on at least one of the faces of each substrate, a network of cathode connections, a network of anode connections and a reactant distribution network, at the end of which the assembly obtained is a base module, a step of assembling at least two base modules, the said holes being formed in such a manner that at least one out of the said first and/or second orifice section of each hole has a surface area which is smaller than the surface area of at least one cross section through the said hole taken in a plane which is parallel to the said opposite faces, and in that, for each hole, the first or second orifice section has a surface area which is smaller than the surface area of the other orifice section.

The step of forming the plurality of holes at each substrate may be effected using any known process, for example by means of an etch, such as plasma etching or wet etching. Once the holes have been formed, individual fuel cells are applied to the lateral surface of each of these holes, for example by successive deposition of a first electrode layer, a membrane layer and a second electrode layer, and if appropriate of current collectors at each of the electrode layers, on the lateral surface of each of the said holes. According to the invention, the deposition of the electrode layers can be effected using any known process which makes it possible to obtain deposits in the form of thin films. This deposition may be effected, for example, by physical vapour deposition (PVD), chemical vapour deposition (CVD), spin coating or by dipping of a base layer, for example of platinized carbon.

According to the invention, the deposition of the membrane layer may be effected, for example, via a liquid route. The material which constitutes the membrane may be selected, for example, from a group consisting of the polyimides, the polyethersulfones, the polystyrenes and derivatives thereof, the polyether ketones and derivatives thereof, the polybenzoxazoles, the polybenzimidaoles and derivatives thereof, the polyarylenes, such as the paraphenylenes and polyparaxylylenes.

The individual cells formed in this way are intended to be electrically connected in order to combine the individual electric powers of each of them. Moreover, these cells must be supplied with reactants. To do this, the process comprises a step of forming a network of electrical connections and a reactant distribution network on at least one of the faces of the substrate.

The photolithography techniques, by means of photosensitive resin or photosensitive dry film may be used to realize these electrical connection steps. Etching techniques may also be envisaged, in particular heavy ion bombardment etching.

The reactant distribution network may be formed by etching channels into at least one of the faces of the substrate, the said channels being responsible for routing the reactants, and it being possible for the said routing to be optimized by application of a diffusion layer.

FIG. 1 shows a hole 1 with a geometry in accordance with the present invention, on the walls of which hole are disposed layers which constitute an individual cell, during a step which forms part of the process of the invention.

According to this particular embodiment, the hole 1 is in the shape of a truncated pyramid, more specifically with a square base, and opens out on either side of opposite faces 9a, 9b of a substrate 9 via a first orifice section denoted by 1a and a second orifice section 1b, the surface area of the first orifice section being, in this particular case, smaller than all other cross sections through the hole taken in a plane which is parallel to the abovementioned opposite faces, and the said hole having a lateral surface 1c. This hole has a sloping internal profile, which contributes to facilitating the step of forming the individual cells, compared to a hole whose walls were to be perpendicular to the opposite faces of the said substrate.

The following are disposed in succession on the lateral surface 1c of this hole:
   an anode current collector 2, the said current collector being connected at the surface to a network of anode connections in the form of tracks 3;
   a first electrode layer 4, which according to this embodiment performs the function of an anode;
   a membrane layer 5;
   a second electrode layer 6, which performs the role of cathode;
   a cathode current collector 7, connected at the surface to a network of cathode connections in the form of tracks 8.

According to the terminology of the invention, the substrate, provided with holes within which individual cells are formed, constitutes a base module, the said module being intended to be assembled with at least one further module so as to form at least one cavity level.

It should be noted that the term "cavity level", where used in the description of the invention, refers to the assembly which results from two base modules as defined above being assembled.

Figure 2:
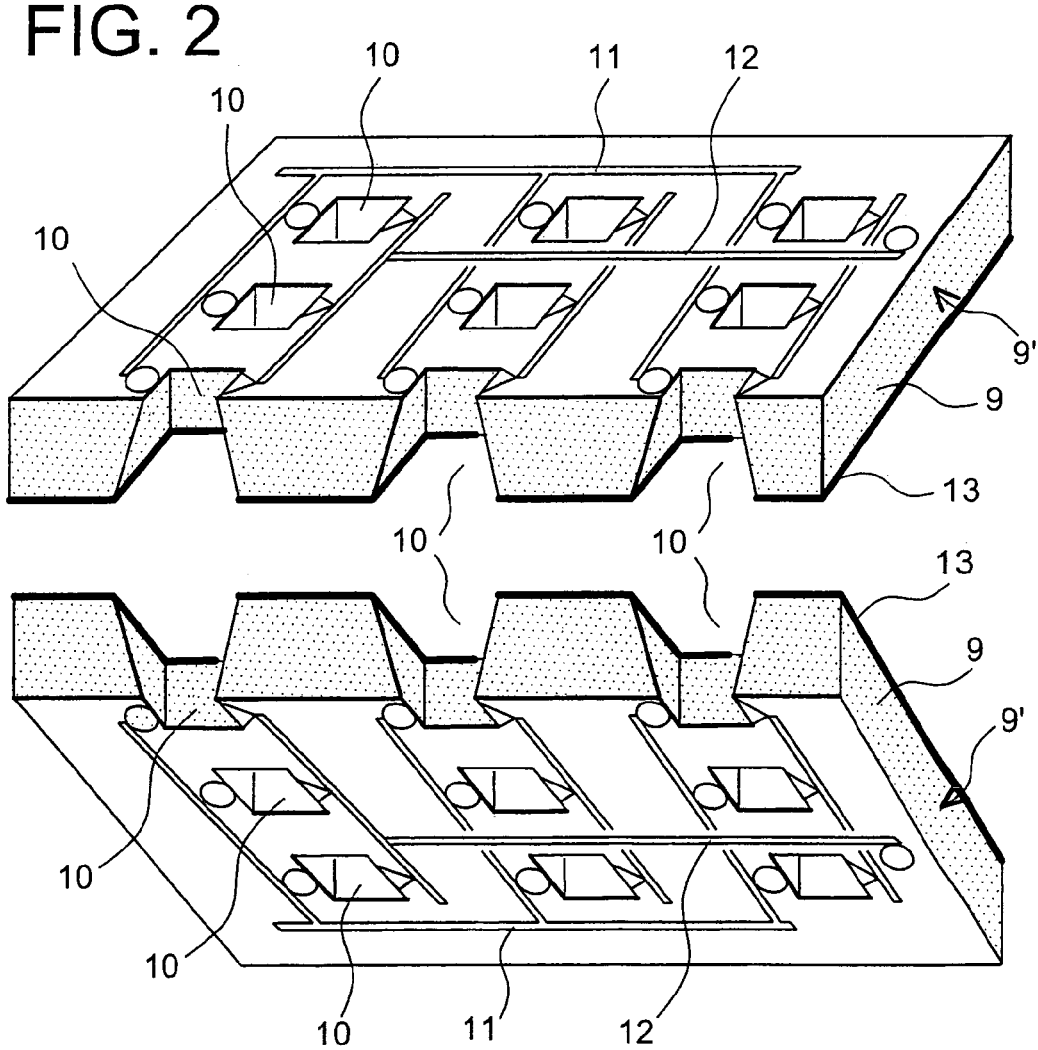
FIG. 2 shows an isometric projection, illustrating an assembly of two base modules (the said assembly of two base modules being referred to according to the terminology of the invention as "cavity level").

FIG. 2 makes it possible to understand, according to one specific embodiment of the invention, the way in which two base modules, denoted by 9', are assembled.

Thus, this figure represents two substrates 9 which are substantially identical and parallelepipedal in shape, provided with three rows of holes 10 which are in the shape of a truncated pyramid with a square base. Each hole 10 constitutes an individual cell as described above in FIG. 1, with the various cells being electrically connected in series by a network of electrical connections 11, 12 (anodic and cathodic, respectively) in the form of tracks, such that the active surface areas of each individual cell are combined cumulatively. It will be obvious that according to a variant of the invention the electrical connection between the various cells may be in parallel. To facilitate illustration, the reactant distribution network is not shown in this figure.

Prior to assembly, according to this specific embodiment of the invention, the faces without networks of electrical connections and reactant distribution networks of two base modules are covered with a bonding layer 13 which is impervious to the reactants. This bonding layer may, for example, be the membrane layer, used in particular for its sealing properties with respect to the reactants, but may also be a layer which has adhesive properties, the said layer being formed, for example, by a material selected from a group consisting of epoxides, polyimides, silicones, acrylic polymers.

It should be noted that the assembling of two base modules must be performed in such a manner that the holes of one base module are positioned so as to face the holes of the adjacent base module(s), so that the active surface area of a hole of one module is combined cumulatively with the active surface area of the hole of the adjacent module(s). To achieve this result, the base modules intended to be assembled are, for example, positioned with the aid of a double-surface positioning machine with, at each module, a positioning cross system.

Once positioning has been effected, assembly is completed by a step of joining the two base modules, it being possible for the said step to be performed using various techniques.

Thus, it is possible to envisage joining by clamping, in particular when the bonding layer applied to at least one of the faces of the module which do not have networks does not have sufficient adhesive properties to ensure cohesive bonding of the two base modules.

The joining may also be effected by adhesive bonding. Among adhesive bonding techniques that may be envisaged, mention may be made of bonding by molecular adhesion, bonding by application of an adhesive or by welding of polymer materials of the same type after treatment in the vicinity of the glass transition temperature. For example, if the bonding layer is of the same composition as the membrane layer, the said membrane being made from polymer material, the joining can be obtained by heat treatment of the layer at a temperature greater than or equal to the glass transition temperature of the polymer.

The assembly which results from this step of joining two base modules constitutes, according to the terminology of the invention, a cavity level.

To obtain fuel cells with an even higher ratio between the active surface area and the floor occupying area of the said fuel cell, it is possible, according to the invention, to envisage assembling more than two base modules, for example by assembling at least two cavity levels or at least one cavity level with at least one base module.

To do this, it is advantageous for assembling of this nature, if necessary, to include a step of masking the networks of electrical connections and reactant distribution networks on the faces intended to be bonded by means of an impervious and insulating layer, a step of planarizing the face(s) provided with the said networks followed by a step of applying a bonding layer to at least one of the faces intended to be bonded, and finally by a step of joining the faces in question.

These same steps can also be applied in instances where it is necessary to assemble two base modules of which at least one of the faces to be bonded is provided with a network of anodic and/or cathodic connections and/or a reactant distribution network.

As its name would indicate, the masking step consists in masking the networks of electrical connections and the reactant distribution networks, in order to avoid the problems of short circuits during the bonding of the two faces and the problems of leakage of reactants.

This step is, for example, performed by the application of an impervious and insulating layer.

The planarization step consists in making the outer faces provided with networks which are intended for bonding planar, for example by the application of a planarizing layer or by a mechanical process, such as polishing. This planarization step is necessary in order to avoid any problem of surface discontinuity during assembly of the modules.

One particularly advantageous embodiment of the invention consists in performing the masking step, the planarization step and the step of applying a bonding layer by application of a single layer which is, for example, either a layer of identical composition to the membrane, consisting, for example, of Nafion®, or a layer of inorganic material, such as a material chosen from silicon oxide, silicon nitride, or alternatively a multilayer consisting of these various materials.

Figure 3:
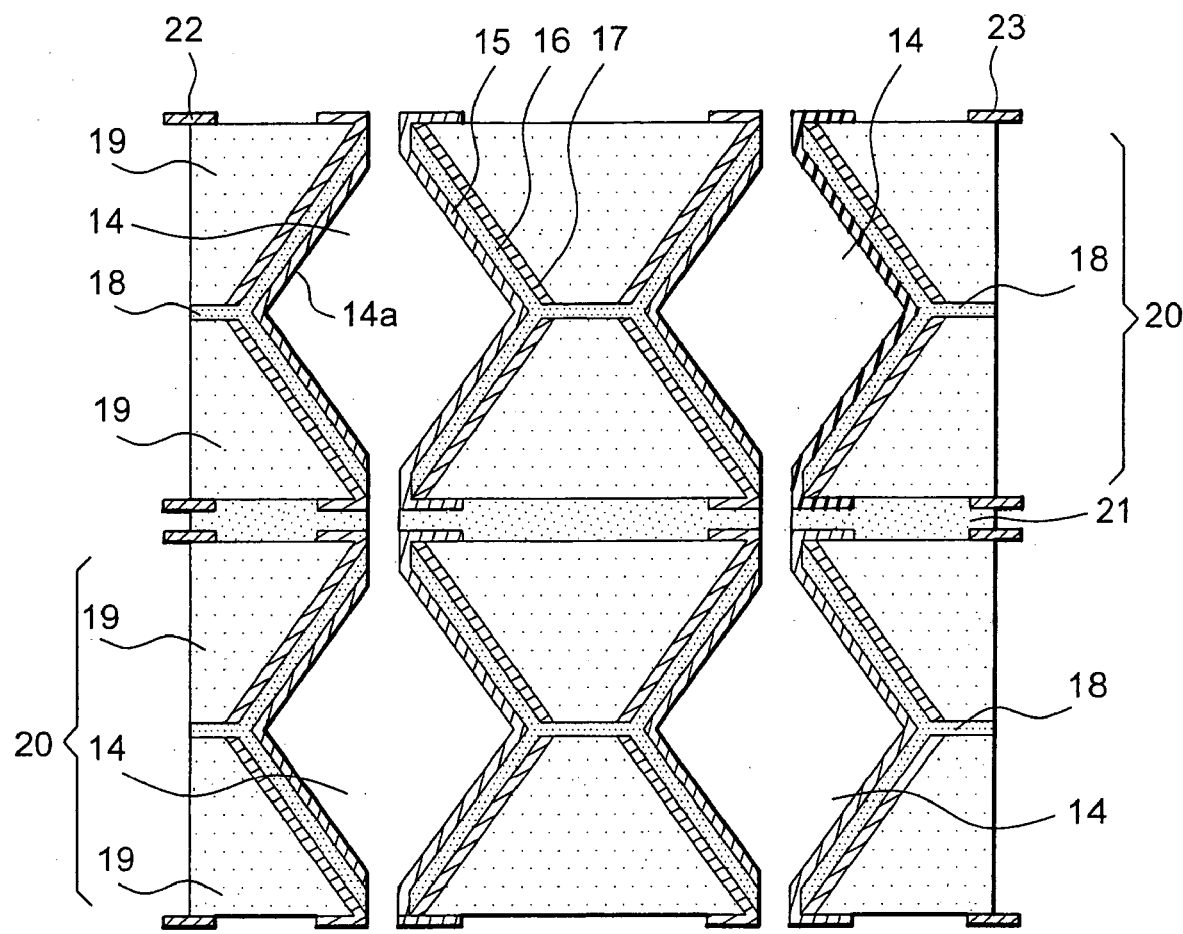
FIG. 3 shows a sectional view representing an assembly which results from two cavity levels being joined side by side, the said assembly being obtained using a process according to the invention.

FIG. 3 illustrates a sectional view through a fuel cell resulting from the bonding of two cavity levels, obtained according to a particular embodiment of the invention.

The holes 14 formed at these various base modules are in the shape of a truncated cone, which corresponds to a hole geometry in accordance with the present invention.

The superpositioning of layers, namely a first electrode layer 15, a membrane layer 16 and a second electrode layer 17, will be noted on the lateral surface 14a of each hole 14.

A layer 18, corresponding to an impervious bonding layer, is responsible for ensuring leaktightness between two adjacent base modules 19 which, by virtue of being assembled, constitute a cavity level 20. In this configuration, obtained according to a particular embodiment of the invention, the layer 18 is of identical composition to the membrane layer 16. It should be noted that according to this particular embodiment, the assembling of two base modules 19 in order to produce a cavity level 20 consists in assembling two faces without networks.

A single layer 21 which is simultaneously responsible for adhesion, leaktightness, insulation and planarization, is responsible for assembling two cavity levels 20. According to this configuration, obtained according to a particular embodiment of the invention, the single layer 21 is of identical composition to the membrane layer 16.

The cells of the two cavity levels are electrically connected to one another by way of networks of electrical connections 22, 23 in series.

The assembling of two base modules in order to form a cavity level, and also of two cavity levels, may be envisaged in various ways.

Figure 4:
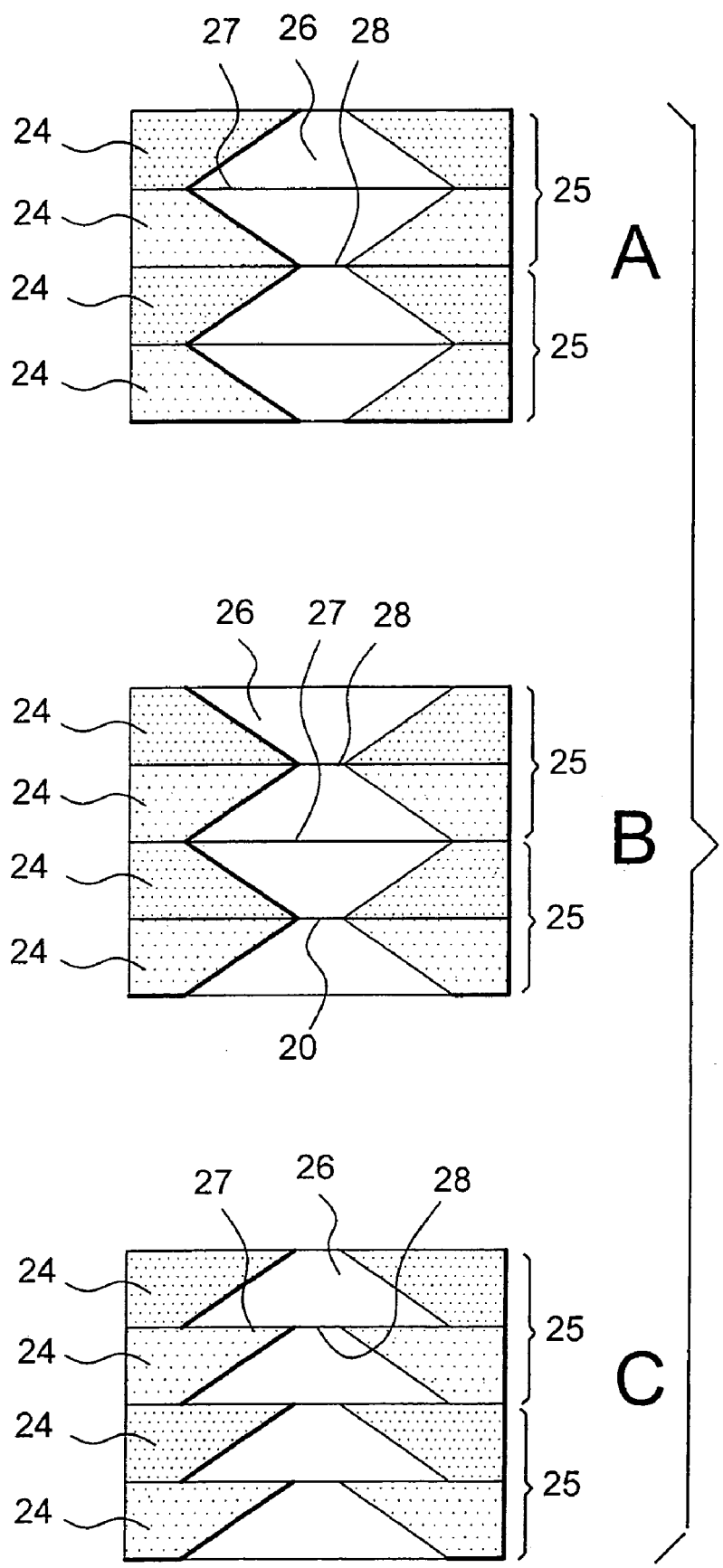
FIG. 4 represents various ways of assembling 4 base modules.

Thus, FIGS. 4A, 4B and 4C illustrate various sectional views through various forms of assembly of 4 base modules. According to these particular embodiments, each of the base modules comprises a plurality of holes, the said holes being in the shape of a truncated cone.

According to FIG. 4A, each of the two cavity levels 25 results from the assembling of two base modules 24, in particular by placing the bases 27 (represented by a solid line in the figure) of the holes 26 facing one another, the said levels then being assembled by placing the vertices 28 (shown as solid lines in the figure) of the cavities thus formed facing one another.

According to FIG. 4B, each of the cavity levels 25 results from the assembling of two modules 24, in particular by placing the vertices 28 of the holes 26 facing one another, the said levels then being assembled in particular by placing the bases 27 of the cavities thus formed facing one another.

Finally, according to FIG. 4C, each of the cavity levels 25 results from the assembling of two base modules 24 by placing the holes 26 with the base 27 of one facing the vertex 28 of the other, the said levels then being assembled by placing the cavities formed in this way with the base 27 of one facing the vertex 28 of the other. These different assembly variants contribute to the creation of complex cavities forming the seat of individual cells which constitute the fuel cell, with a large internal surface area compared to the surface area of the orifice sections of the resultant cavities. The result is a large active surface area compared to the visible surface area of the assembly formed in this way.

The invention will now be described with reference to the following illustrative, non-limiting example.

EXAMPLE

The objective is to develop an active surface area of 350 cm$^2$ for a visible surface area of 25 cm$^2$ and an energy of 10 Wh.

To do this, the substrate is a single-crystal silicon wafer with a thickness of 400 micrometres and a visible surface area of 25 cm$^2$, on which is etched a network of holes. The holes are formed by plasma etching and have a square cross section with a side length of 100 micrometres, an opening surface area of 56%, the opening surface area corresponding to the ratio between the hollow surface area and the total surface area, and a reduction factor of 80% between the entry surface area and the exit surface area of the holes. Consequently, the developed surface area is seven times larger than the visible surface area. The thin films required to form a fuel cell are deposited in succession on the flanks of the holes, these films specifically comprising:

an anode comprising, in the context of the present example, a current collector and a catalyst layer deposited by spraying of an active ink;

a fine electrolyte membrane in the form of a thin film of NAFION®, deposited by dipping;

a catalyst layer deposited on the membrane in order to activate the reaction at the cathode, followed by a metallic deposition intended to ensure collection of the electric current at the cathode.

The networks of anodic and cathodic connections are formed, according to this example, on one of the faces of the substrate, by means of photolithography techniques using photoresists and photosensitive dry films, and the reactant distribution network is formed by etching of the channels. A base module is obtained at the end of these steps.

The assembling of two base modules is performed via NAFION® layers, bonded after heat treatment at a temperature which is greater than the glass transition temperature. A cavity level is obtained in this way.

The assembling of a plurality of cavity levels is performed by a silica layer and is completed by a molecular bonding step.

It should be noted that the precise positioning of the modules or of the cavity levels intended to be assembled is effected with the aid of a double-surface positioning machine.

The invention claimed is:

1. A process for producing a fuel cell, said fuel cell comprising a set of individual cells which are electrically connected to one another, each one of said individual cells comprising at least three layers including a membrane layer positioned between a first electrode layer and a second electrode layer, said process comprising, in succession, the steps of:

providing a plurality of substrates, each one of said substrates having a first face, and a second face opposite said first face;

forming a plurality of holes in each of a corresponding one of said substrates, such that each one of said holes opens out on said first face and said second face of said corresponding substrate via a first orifice section and a second orifice section, and each one of said holes having a lateral surface;

forming individual cells on said lateral surface of each one of said holes;

forming, on at least one of said first face and said second face of each substrate, a network of electrical connections and a reactant distribution network, wherein said networks connect said individual cells to one another, forming a base module from an assembly including said substrate, said individual cells, and said networks;

a step of assembling at least two base modules adjacent to each other such that said individual cells of each one of said base modules are positioned facing said individual cells of the adjacent one or ones of said base modules, wherein, during the step of forming said plurality of holes, each one of said holes is formed such that at least one of said first and said second orifice sections has a surface area that is smaller than the surface area of at least one cross-section through said hole taken in a plane which is parallel to said opposite faces, and in that, for each hole, said first or second orifice section has a surface area which is smaller than the surface area of the other orifice section.

2. The process for producing a fuel cell according to claim 1, wherein each one of said holes is substantially in the shape of a truncated cone.

3. The process for producing a fuel cell according to claim 1, wherein each one of said holes is substantially in the shape of a truncated pyramid.

4. The process for producing a fuel cell according to claim 1, wherein each one of said holes has a first orifice section and a second orifice section with surface areas which are smaller than the lateral surface of said one of said holes.

5. The process for producing a fuel cell according to claim 1, wherein each one of said holes is produced by etching.

6. The process for producing a fuel cell according to claims 1, wherein each one of said holes is produced by laser ablation.

7. The process for producing a fuel cell according to claim 1, wherein said substrate consists essentially of a material selected from a group consisting of silicon, porous silicon, graphite, ceramics, and a polymer.

8. The process for producing a fuel cell according to claim 1, wherein each one of said individual cells is formed by successive deposition, on the lateral surface of each one of said holes, of at least three layers, in order to form said first electrode layer, said membrane layer and said second electrode layer.

9. The process for producing a fuel cell according to claim 8, wherein the step of forming said individual cells also comprises the step of depositing current collectors at each electrode layer.

10. The process for producing a fuel cell according to claim 1, wherein said step of assembling two base modules includes the steps of providing two base modules each having one face without networks and placing said two faces without networks facing one another, applying a bonding layer to at least one of said faces without networks, and joining said two base modules at said faces facing one another.

11. The process for producing a fuel cell according to claim 1, wherein in said step of assembling at least two base modules includes the steps of placing one of said base modules having a face provided with said network of electrical connections and/or a reactant distribution network facing a face of another of said base modules, masking said face or faces provided with said network(s) by means of an impervious and insulating layer, planarizing said face or faces provided with the said network(s), applying a bonding layer to at least one of the faces facing one another, and joining said faces facing one another.

12. The process for producing a fuel cell according to claim 10 or 11, wherein the bonding layer includes a layer of identical composition to the membrane layer or a layer made from a material selected from the group consisting of silicon oxide and silicon nitride.

13. The process for producing a fuel cell according to claim 10 or 11, wherein said bonding layer includes an adhesive chosen from epoxides, polyimides, silicones, and acrylic polymers.

14. The process for producing a fuel cell according to claim 10 or 11, wherein said joining step is effected by clamping.

15. The process for producing a fuel cell according to claim 10 or 11, wherein said joining step is effected by molecular adhesion.

16. The process for producing a fuel cell according to claim 10 or 11, wherein said joining step is effected by adhesive bonding.

17. The process for producing a fuel cell according to claim 11, wherein said masking step, said planarization step, and said step of applying the bonding layer are effected simultaneously by application of a single layer.

18. The process for producing a fuel cell according to claim 17, wherein said single layer has a composition identical to said membrane layer.

19. The process for producing a fuel cell according to claim 17, wherein said single layer is made from a material selected from the group consisting of silicon oxide and silicon nitride.

20. A fuel cell comprising:
at least two substrates each comprising a plurality of holes, each hole opening out on each side on two opposite faces of each substrate via a first orifice section and a second orifice section, and each hole having a lateral surface;
individual cells formed on the lateral surface of each of said holes;
on at least one of the said opposite faces of each substrate, a network of electrical connections and a reactant distribution network, said networks connecting said individual cells to one another,
wherein a base module is comprised of an assembly of one of said substrates including the individual cells and said networks,
and wherein at least two of said base modules are assembled together such that said individual cells of one of said base modules are positioned facing said individual cells of another of said base modules, wherein, for each hole, at least one of said first and second orifice section has a surface area that is smaller than the surface area of at least one cross section through said hole taken in a plane which is parallel to said opposite faces, and in that, for each hole, said first or second orifice section has a surface area that is smaller than the surface area of the other orifice section.

* * * * *